Patented Oct. 7, 1952

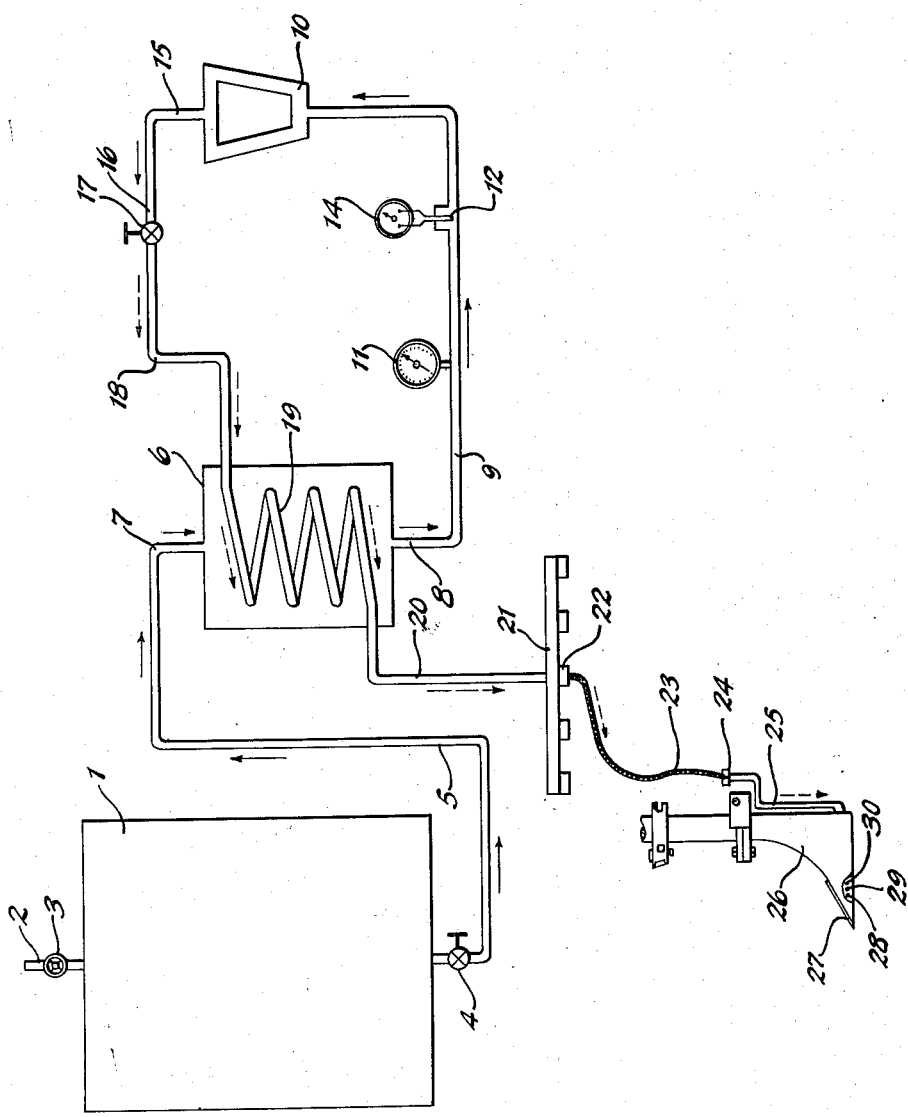

2,612,760

UNITED STATES PATENT OFFICE 2,612,760

APPARATUS FOR METERING AND DISTRIBUTING ANHYDROUS AMMONIA IN A LIQUID STATE

Thomas Laffin Baggette, Leland, Miss., and Alton Russell Copithorne, Chelsea, Mass., assignors, by mesne assignments, to The Sperry Corporation, New York, N. Y., a corporation of Delaware Application December 9, 1948, Serial No. 64,354

2 Claims. (Cl. 62—1)

Our invention relates broadly to metering systems for fluids and gases, and more particularly to a method and apparatus for metering anhydrous ammonia and other chemicals in the liquid state.

One of the objects of our invention is to provide a method of metering anhydrous ammonia and other chemicals which have a tendency to boil or bubble in the liquid state, which agitation of the fluid normally causes substantial inaccuracies in the operation of measuring devices used for measuring the flow of such agitated fluids.

Another object of our invention is to provide a method of operating a flowmeter for metering the flow of a liquid under conditions of considerable agitation for accurately indicating the amount of liquid passing through the system.

Still another object of our invention is to provide a method for metering fluids subject to considerable agitation from boiling by cooling the liquid to a temperature below the boiling point at the measuring position, utilizing the low temperatures generated by gas derived from the liquid through a circulatory system passing through the liquid supply.

A further object of our invention is to provide a method for accurately measuring the flow of a liquid subject to considerable agitation from boiling which consists in refrigerating the liquid by wet gas derived from the liquid at a position preceding the measuring position in the liquid flow system whereby the substantially continuous flow of liquid may be measured with precision.

A still further object of our invention is to provide an apparatus for accurately measuring the flow of fluids subject to substantial boiling and bubbling in which a heat exchanger is interposed between the measuring device and the liquid supply and the heat exchanger operated by gases derived from the liquid flow for cooling the liquid flow at the measuring position and substantially eliminating appreciable boiling and agitation for obtaining readings on the measuring apparatus of a substantially continuous flow of liquid.

Other and further objects of our invention reside in an arrangement of metering apparatus for anhydrous ammonia and other chemicals in the liquid state, as set forth more fully in the specification hereinafter following, by reference to the accompanying drawing, which diagrammatically and schematically shows the application of our invention to a portable type of tractor drawn agricultural fertilizer distributing machine for injecting anhydrous ammonia into the soil simultaneously with cultivation or plowing.

Our invention is directed to a method and apparatus for metering anhydrous ammonia and other chemicals in the liquid state pressure using a variable orifice flowmeter.

Anhydrous ammonia ($NH_3$), when it is withdrawn from a pressure vessel in which it is stored, has a tendency to boil, bubble, or agitate in the liquid phase. This action of boiling, bubbling, or agitating, results in great inaccuracies in the reading of a variable orifice flowmeter or rotometer, so that the instrument in itself is not useful for this purpose. Our invention provides a method and system by which it is practical to employ a conventional flowmeter to meter the flow of a boilable liquid from a pressure tank and accurately know the quantity of the liquid which is being withdrawn from the tank.

Referring to the drawing in more detail, reference character 1 designates a pressure vessel or pressure storage tank for anhydrous ammonia ($NH_3$) which is supplied to the tank through charging connection 2 and valve 3 from which the liquid passes through shutoff valve 4 and high-pressure pipe 5 to the heat exchanger collecting tank 6. The liquid $NH_3$ passes through the heat exchanger collecting tank 6 from the inlet connection 7 to the outlet connection 8. Outlet connection 8 connects through a relatively short distribution pipe 9 to the intake of the variable orifice flowmeter 10. The relatively short pipe 9 provides a connection for a pressure gauge 11 and for a thermocouple 12 which connects to the temperature indicating meter 14.

Output of the variable orifice flowmeter 10 indicated at 15 connects through pipe 16 to the throttle valve 17 from which the connection 18 extends for conducting wet gas from the throttle valve 17 to the coiled pipe 19 located centrally within the heat exchanger collecting tank 6 through which the liquid $NH_3$ is flowing. The output from the coiled pipe 19 connects to pipe 20 which extends to the manifold 21. The manifold 21 connects to the distribution system for the anhydrous ammonia gas. For purposes of explaining the invention I have shown one of the connections 22 on manifold 21 connected through flexible pipe 23 and coupling 24 to the anhydrous ammonia distribution pipe 25 attached to the rear of the applicator 26 of the type shown, for example, in copending application Serial No. 64,355 filed December 9, 1948, by Thomas Laffin Baggette and Alton Russell Copithorne. The anhydrous ammonia gas is distributed at each side of the applicator point 27 through apertures in the side of the applicator, one set of which has been represented at 28, 29, and 30.

It will be understood that the particular applicator system shown is to be regarded in the illustrative sense and not in the limiting sense, as other forms of applicators may be supplied with the gases developed in the system shown.

The coil 19 within the heat exchanger collecting tank 6 conveys gases developed at the throttle valve 17, which gases are refrigerating in character and have such a low temperature that the gases in coil 19 cool the liquid $NH_3$ in heat exchanger collecting tank 6 below the boiling or bubbling or agitating state by having the wet gas in coil 19 absorb heat from the liquid $NH_3$ as it passes from the intake 7 to the outlet 8 of the heat exchanger collecting tank 6. The wet gas in coil 19 has a lower temperature than the liquid $NH_3$ and is forced by its own vapor pressure through the throttle valve or orifice 17.

We have shown the direction of flow of the liquid $NH_3$ through the system by solid line arrows, while the direction of flow of the wet gas developed at the throttle valve 17 has been indicated by dotted line arrows. As the wet gas flows through the convolutions of coil 19, as indicated by the dotted line arrows, the liquid $NH_3$ in heat exchanger collecting tank 6 is cooled below its boiling or bubbling, or agitation point and passes through discharge connection 8 and pipe 9 to the pressure gauge 11 and temperature measuring thermocouple 12 through the flowmeter 10. In lieu of the thermocouple 12 connected electrically with measuring instrument 14 calibrated according to temperature to which thermocouple 12 is subjected, we may provide mounting means for a thermometer in pipeline 9 for measuring temperature of the liquid flowing in pipe 9. Thus, the pressure and temperature properties of the liquid $NH_3$ may be accurately determined in the course of flow of the liquid $NH_3$ through pipe 9. Conditions may thereby be established for the most practical generation of wet gas from the liquid $NH_3$. The flow of fluid $NH_3$ in pipeline 9 is for all practical purposes substantially continuous, as agitation, boiling, and bubbling have been eliminated through the refrigeration or cooling effect produced by coil 19 through which the wet gas is forced by the liquid $NH_3$ from pressure storage tank 1. It will be observed that the properties of the $NH_3$ when converted from a liquid to a gas are utilized to treat the same $NH_3$ in the liquid state for substantially eliminating the boiling, bubbling, or agitated condition. In other words, the gas derived from the liquid $NH_3$ is utilized to eliminate boiling, bubbling, and agitation in the liquid prior to the conversion thereof to the gaseous state.

While we have illustrated the system of our invention applicable to the variable orifice type of flowmeter represented schematically at 10, it will be understood that the method of our invention is applicable to all types of flowmeters adapted for measuring not only $NH_3$, but any fluid materials. The system of our invention is applicable to permanent installations as well as the portable installation illustrated herein.

We have found the system of our invention highly practical in operation, and while we have disclosed our invention in one of its preferred embodiments, we desire that it be understood that no limitations upon our invention are intended other than may be imposed by the scope of the appended claims.

What we claim as new and desire to secure by Letters Patent of the United States is as follows:

1. In a portable system for controlling, metering, and distributing fluids subject to considerable agitation from boiling, a storage tank for storing fluids under pressure, a heat exchanger collecting tank connected with said storage tank, a discharge connection from said heat exchanger collecting tank, a flowmeter having an intake connection and a discharge connection, a connection between the discharge connection of said heat exchanger collecting tank and the intake connection of said flowmeter, temperature and pressure measuring devices located in said connection a throttle valve connected with the discharge connection of said flowmeter, a circulatory coil disposed in said heat exchanger collecting tank and connected at one end of said throttle valve and connected at the opposite end with a distributing system, said throttle valve operating to derive a low temperature gas from said fluid flow for passage through said coil and the absorption of heat from the fluid in said heat exchanger collecting tank for maintaining said fluid in a substantially constant fluid flow path with minimum agitation from boiling, and means for discharging the gas in needle-like streams to a surrounding medium which is at substantially atmospheric pressure.

2. Portable apparatus for controlling, metering and distributing fluids subject to considerable agitation from boiling comprising a pressure storage tank for fluid subject to boiling on a mobile unit, a pressure tank for fluid, a heat exchanger tank connected with said pressure tank, a flowmeter connected with said heat exchanger tank, pressure measuring means interposed in said last mentioned connection, a throttle valve connected with said flowmeter for deriving from said fluid a low temperature gas, means associated with said heat exchanger tank and connected with said throttle valve for subjecting the fluid in the course of the passage thereof through said heat exchanger tank to a drop in temperature for substantially eliminating the boiling condition thereof prior to the passage of said fluid through said flowmeter and means connected with said last mentioned means for distributing said low temperature gas, and continuously discharging the gas in needle-like streams to a surrounding medium which is at substantially atmospheric pressure.

THOMAS LAFFIN BAGGETTE.
ALTON RUSSELL COPITHORNE.

REFERENCES CITED

The following references are of record in the file of this patent:

UNITED STATES PATENTS

| Number | Name | Date |
|---|---|---|
| 2,007,251 | Kriskern | July 9, 1935 |
| 2,319,567 | Vegell | May 18, 1943 |
| 2,402,355 | Whaley, Jr. | June 18, 1946 |
| 2,480,600 | Paul, Jr. | Aug. 30, 1949 |